(12) United States Patent
De Nale et al.

(10) Patent No.: US 10,575,454 B2
(45) Date of Patent: Mar. 3, 2020

(54) HEADLAND MANAGEMENT SYSTEM FOR AN AGRICULTURAL VEHICLE

(71) Applicant: CNH Industrial America, LLC, New Holland, PA (US)

(72) Inventors: Saverio De Nale, Modena (IT); Marco Pradelli, Maranello (IT); Simone Garagnani, Panaro (IT)

(73) Assignee: CNH Industrial America LLC, New Holland, PA (US)

( * ) Notice: Subject to any disclaimer, the term of this patent is extended or adjusted under 35 U.S.C. 154(b) by 144 days.

(21) Appl. No.: 15/551,404

(22) PCT Filed: Feb. 10, 2016

(86) PCT No.: PCT/EP2016/052767
§ 371 (c)(1),
(2) Date: Aug. 16, 2017

(87) PCT Pub. No.: WO2016/131684
PCT Pub. Date: Aug. 25, 2016

(65) Prior Publication Data
US 2018/0054954 A1   Mar. 1, 2018

(30) Foreign Application Priority Data

Feb. 17, 2015 (IT) .............................. MO2015A0029

(51) Int. Cl.
*A01B 79/00* (2006.01)
*A01B 69/00* (2006.01)
(Continued)

(52) U.S. Cl.
CPC .......... *A01B 79/005* (2013.01); *A01B 59/066* (2013.01); *A01B 69/004* (2013.01);
(Continued)

(58) Field of Classification Search
CPC ... A01B 79/005; A01B 59/066; A01B 69/004; A01B 69/008; A01B 69/007;
(Continued)

(56) References Cited

U.S. PATENT DOCUMENTS

| 5,899,950 A * | 5/1999 | Milender ........... G05B 19/0426 |
| | | 318/568.13 |
| 2001/0016794 A1* | 8/2001 | Falck ..................... A01B 63/00 |
| | | 701/50 |

(Continued)

FOREIGN PATENT DOCUMENTS

| EP | 2020170 | 2/2009 |
| EP | 2583544 | 4/2013 |

(Continued)

OTHER PUBLICATIONS

Intalian Patent Office International Search Report dated Nov. 5, 2015 (102 pages).

*Primary Examiner* — Muhammad Shafi
(74) *Attorney, Agent, or Firm* — Rebecca L. Henkel; Rickard K. DeMille (57) ABSTRACT

An agricultural vehicle (10) includes at least one geospatial sensor (44) for locating the vehicle (1) within a geographic area (14); at least one event trigger; at least one actuator for actuating a component onboard the vehicle (10); and a headland management system (HMS) (30) for carrying out a headland turn sequence (HTS) at a predetermined location within the geographic area (14). The HMS (30) includes a memory (34) for storing at least a portion of an HTS, and a visual display (46) for displaying at least a portion of an HTS. The vehicle (10) is characterized in that the HMS (30) is configured to display a real-time map on the visual display (46), including a position of the vehicle (10) on the map, and at least one future HTS event forming at least part of an (Continued)

HTS. The HMS (30) is configured to allow an operator to modify at least one HTS event on the real-time map.

20 Claims, 12 Drawing Sheets

(51) Int. Cl.
    *A01B 59/06*     (2006.01)
    *A01B 69/04*     (2006.01)
    *B60K 35/00*     (2006.01)
    *B60W 10/04*     (2006.01)
    *B60W 10/10*     (2012.01)
    *B60W 50/10*     (2012.01)
    *G05D 1/02*     (2020.01)

(52) U.S. Cl.
CPC .......... *A01B 69/007* (2013.01); *A01B 69/008* (2013.01); *B60K 35/00* (2013.01); *B60W 10/04* (2013.01); *B60W 10/10* (2013.01); *B60W 50/10* (2013.01); *G05D 1/0219* (2013.01); *G05D 1/0223* (2013.01); *G05D 1/0274* (2013.01); *G05D 1/0278* (2013.01); *B60K 2370/11* (2019.05); *B60K 2370/1438* (2019.05); *B60K 2370/152* (2019.05); *G05D 2201/0201* (2013.01)

(58) Field of Classification Search
CPC .. G05D 1/0274; G05D 1/0219; G05D 1/0223; G05D 1/0278; G05D 2201/0201; B60K 35/00; B60K 2370/1438; B60K 2370/11; B60K 2370/152; B60W 10/04; B60W 10/10; B60W 50/10
USPC .......................................................... 701/25
See application file for complete search history.

(56) References Cited

U.S. PATENT DOCUMENTS

2010/0023229 A1     1/2010    Chiocco
2013/0103269 A1*   4/2013    Meyer Zu Helligen ....................
                                                                A01B 79/005
                                                                         701/50

FOREIGN PATENT DOCUMENTS

EP            2624678        8/2013
EP            2710873        3/2014

* cited by examiner

| | | | |
|---|---|---|---|
| Special trigger | | | |
| Disengage Front or Rear PTO | | | |
| Engage Front or Rear PTO | | | |
| Front Hitch Up or Down | | | |
| Rear Hitch Up or Down | | | |
| Direction change | | | |
| crpm, remote pumping start/finish, target gear, 12 volt act/dead, Target speed | | | |
| Standard trigger | | | |

HEADLAND MANAGEMENT SYSTEM FOR AN AGRICULTURAL VEHICLE

BACKGROUND OF THE INVENTION

The present invention relates to a control system used with a precision farming system, and, more particularly, to a control system used with a headland turn sequence associated with an agricultural vehicle.

Precision farming systems are widely used with agricultural vehicles. In general, a precision farming system or technique uses geospatial data for a given geographic region (e.g., agricultural field, strip or other area) and carries out one or more specified tasks based at least in part on the geospatial data. The geospatial data is usually derived from a global positioning system (GPS) sensor located onboard the vehicle, and the position of the vehicle at least in part triggers various actions or tasks to occur.

For example, agricultural vehicles such as sprayers, fertilizer spreaders, planters, etc, can carry out variable rate application of a product to the field based on the geospatial data. The fields can be mapped for soil type, fertility or pH levels, etc, and the GPS data for the current position of the vehicle can trigger different application rates as the vehicle traverses across the field.

Many field operations (e.g., tillage and cultivation) require the operator to repeat a set of operations each time the tractor traverses the field and turns the tractor at a headland (which are the areas of untilled soil at ends of the field, which are typically worked last during operation). As implements become more complicated, these repeated operations become monotonous and tiring. Tractors that have some or all of these operations under electronic control lend themselves to the automation of these repetitive tasks.

Several Headland Turn Sequence (HTS) systems have been developed by tractor manufacturers with the aim of reducing the number of repetitive movements that the driver is required to perform. In general, one or more operations (or sequence events) are stored and/or recorded in a memory within a vehicle control unit (VCU), and based upon a trigger such as GPS data the HTS can be carried out automatically by the VCU. An example of such an HTS system is disclosed in EP 1 316 868 B1, which is assigned to the assignee of the present invention. Other examples of HTS systems are described, e.g., in EP 2 710 873; EP 2 624 678; EP 2 020 170; FR 2 764 401, U.S. Pat. No. 5,899,950, US Pub. No. 2001/0016794. These systems range from simple automatic disabling of the power take-off (PTO) shaft when the hitch is raised to recording and playback of a complex sequence of operations. Known HTS systems may differ in the way in which the HTS sequence is recorded and played back, and may allow experienced vehicle drivers a degree of control over the recording and playing back of sequences while also permitting fully automated operation, which is more suitable for inexperienced drivers.

What is needed in the art is an HTS system that effectively carries out an HTS and provides easier operation by an operator.

SUMMARY OF THE INVENTION

The present invention provides a headland management system (HMS) with a real-time map on a visual display which allows an operator to make real-time changes to the HTS.

The invention in one form is directed to an agricultural vehicle, including at least one geospatial sensor for locating the vehicle within a geographic area; at least one event trigger; at least one actuator for actuating a component onboard the vehicle; and an HMS for carrying out an HTS at a predetermined location within the geographic area. The HMS includes a memory for storing at least a portion of an HTS, and a visual display for displaying at least a portion of an HTS. The vehicle is characterized in that the HMS is configured to display a real-time map on the visual display, including a position of the vehicle on the map, and at least one future HTS event forming at least part of an HTS. The HMS is configured to allow an operator to modify at least one HTS event on the real-time map.

An advantage of the present invention is that changes to the HTS can be made in real-time "on-the-fly" by an operator using drag and drop functions, etc.

Another advantage is that future HTS events are visually perceptible from past HTS events on the real-time map.

Yet another advantage is that the HMS can provide an operator with a suggested HTS, based upon a past HTS, thereby saving the operator programming time during operation.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views, The exemplifications set out herein illustrate embodiments of the invention, and such exemplifications are not to be construed as limiting the scope of the invention in any manner.

DETAILED DESCRIPTION OF THE INVENTION

Figure 1:
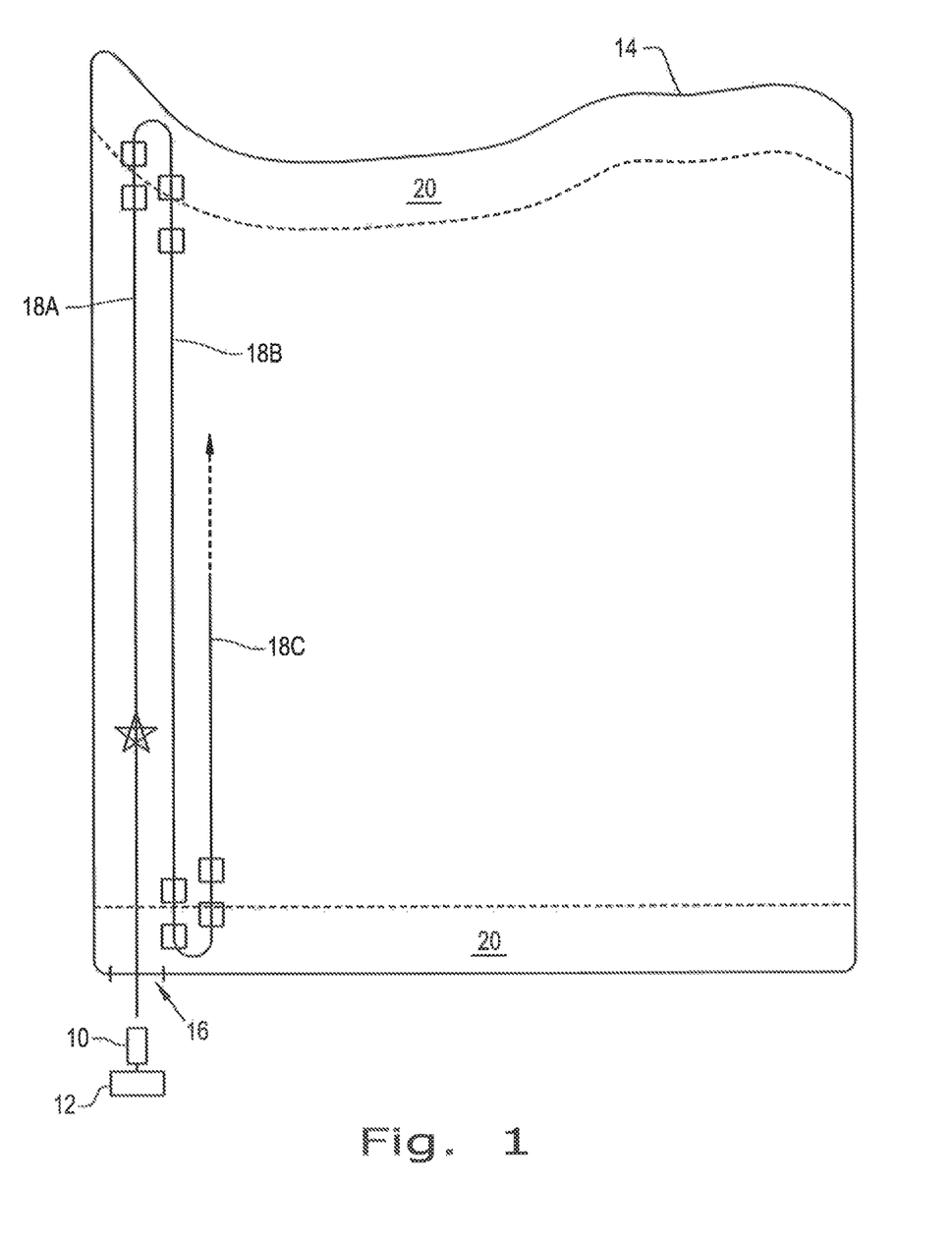
FIG. 1 is a schematic plan view of an agricultural field, illustrating one type of swath pattern and HTS that can occur within a field.

Referring now to the drawings, and more particularly to FIG. 1, there is shown a schematic plan view of a geographic area in the form of an agricultural field, illustrating one type of swath pattern and HTS that can occur within the field. The agricultural vehicle 10 is assumed to be towing an implement 12 and enters the field 14 at an entrance location 16. In the illustrated example, the swath pattern is a back and forth, side by side type of swath pattern, such as may be used with a tillage operation. For example, the agricultural vehicle 10, represented as a star in FIG. 1 when within the bounds of the field 14, can be an agricultural tractor which is towing a chisel plow or field cultivator within the agricultural field 14 of any particular shape. The size and shape of the field 14, as well as any other relevant precision farming data associated with the field 14, can be determined ahead of time and stored within a memory onboard the vehicle 10, as will be described in greater detail below. Based on the width of the implement 12 which is being towed by the agricultural vehicle 10, the width of each parallel swath 18A, 18B, 18C, etc. is known. At opposite ends of the field 14, a headland 20 exists which is basically an area of unfilled soil where the implement 12 is disengaged from the soil, the vehicle 10 is turned around approximately 180°, and the implement 12 is reengaged with the soil as the vehicle 10 leaves the headland 20 and traverses in an opposite direction across the field 14. The actual position of the vehicle 10 at any given time can be tracked with a geospatial sensor, such as a GPS sensor, as is known in the industry.

Based on the field operation being performed, the specific HTS to be carried out at opposite ends of the field 14 can be derived in different ways. For example, the HTS can be recorded by an operator during the field operation, or can be retrieved from a previously stored HTS for the given field operation in the same or a different field, or can be a predefined HTS which is assumed to be standard for that field operation.

Each HTS is assumed to include a number of discrete actions making up the HTS, termed an "HTS event" herein. For example, first the transmission may be downshifted, then the throttle reduced, then the 3 point hitch raised, then a rear wheel on the implement lifted via a hydraulic cylinder. The HTS is illustrated with 4 HTS events in FIG. 1 at each headland 20. The number and types of HTS events can of course vary, depending on the type of field operation, soil type, etc. The HTS events can occur in reverse sequence, or some other sequence, as the vehicle 10 begins to traverse in the reverse direction and exit out of the headland 20.

Figure 2:
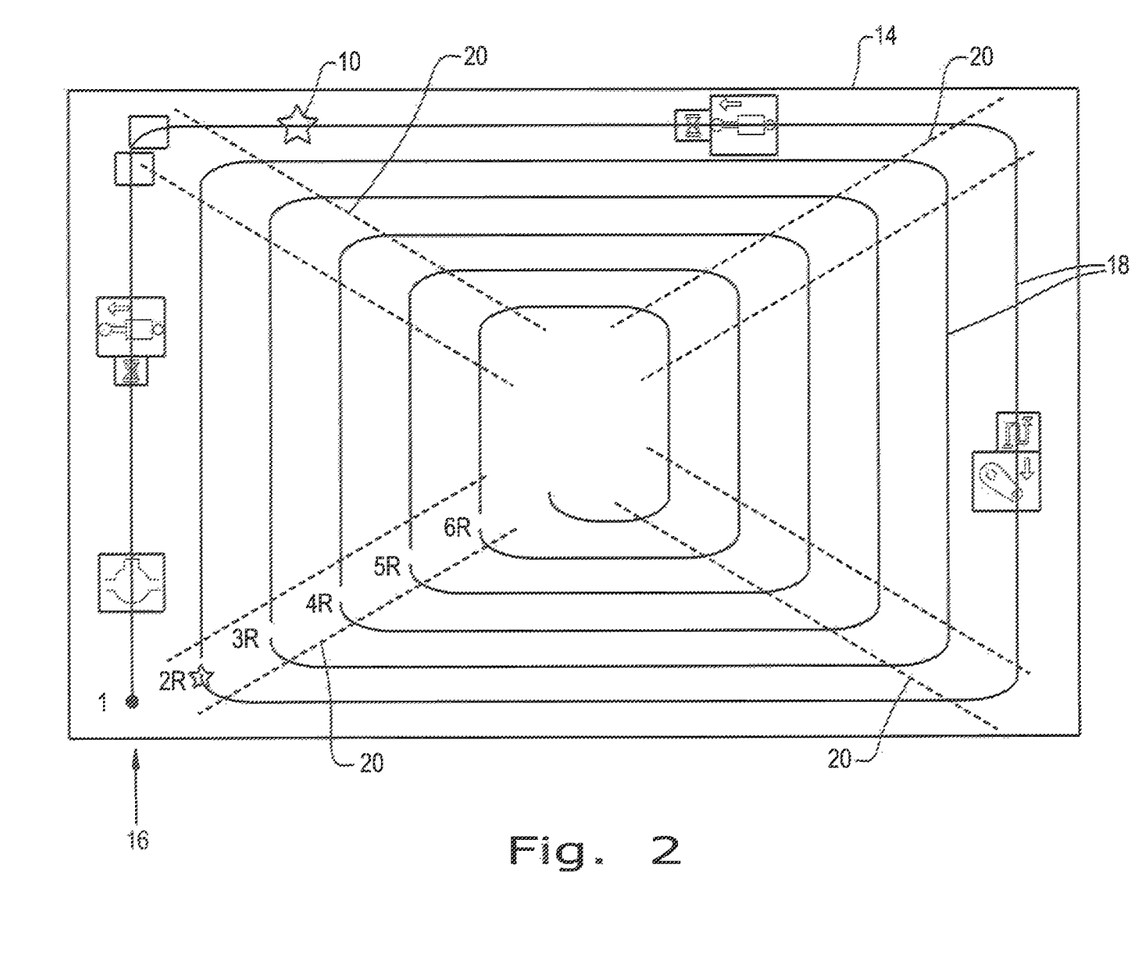
FIG. 2 is a schematic plan view of an agricultural field, illustrating another type of swath pattern and HTS that can occur within a field.

FIG. 2 is a schematic plan view of an agricultural field 14 with another type of swath pattern and HTS that can occur within the field. In the illustrated example, the swath pattern is a circular type of swath pattern, such as may be used with a forage operation. For example, the agricultural vehicle 10, represented as a star in FIG. 2 when within the bounds of the field 14, can be an agricultural tractor which is towing a mower-conditioner or other type of implement which is towed in a circular pattern around the field 14. Each headland 20 is assumed to be a strip region overlying the turn locations (corners) of the field 14 where repetitive actions used in controlling the implement occur during operation. An HTS can thus be conveniently used in each headland 20 to avoid or simplify repetitive actions.

Figure 3:
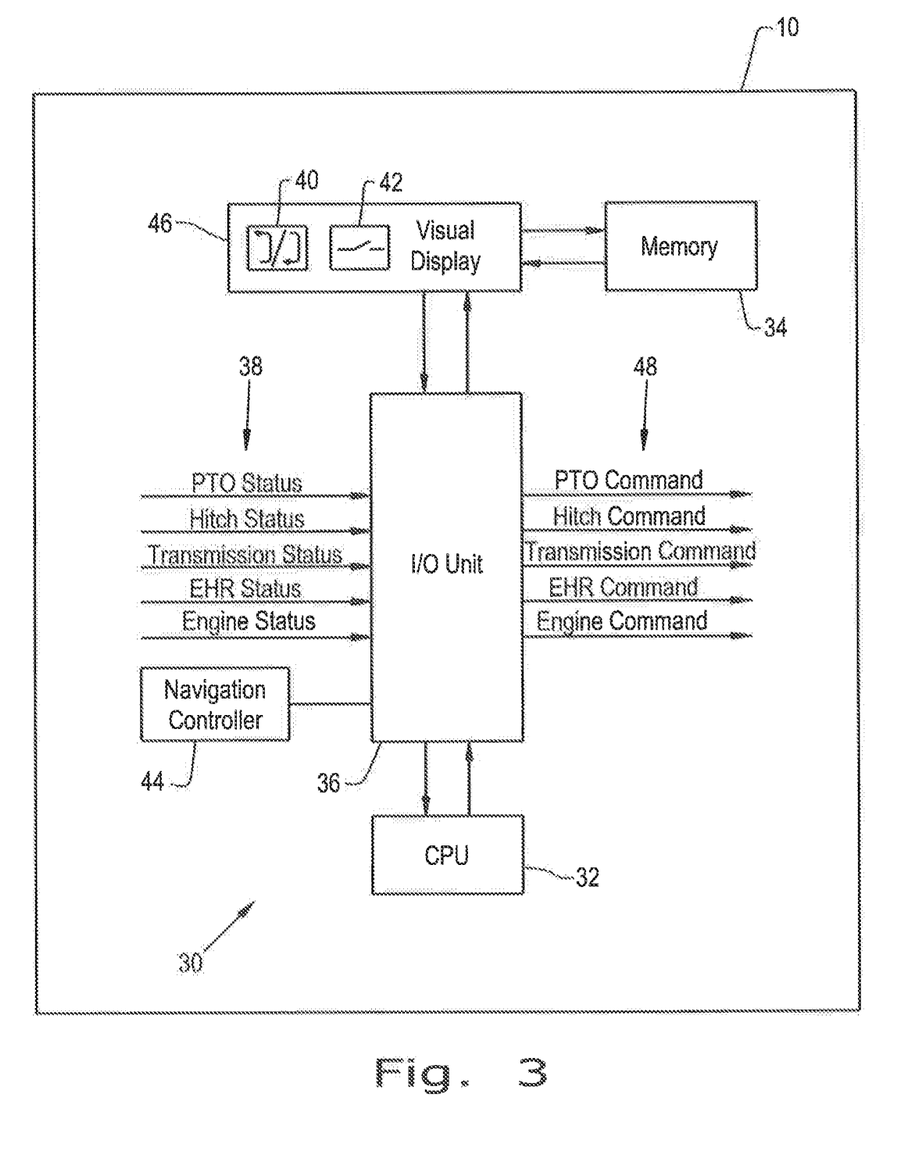
FIG. 3 is a schematic illustration of an agricultural vehicle including an embodiment of an HMS of the present invention.

FIG. 3 is a schematic illustration of an agricultural vehicle 10 including an embodiment of an HMS 30 of the present invention for carrying out an HTS at a predetermined location within the field. The HMS 30 may be implemented in part within a VCU including a processing unit 32, a memory 34 and an input/output (I/O) unit 36. The memory 34 is used to store and/or playback at least a portion of an HTS. The I/O unit 36 can receive inputs 38 indicative of the status of various sub-systems and components which act as event triggers associated with an HTS. In the illustrated embodiment, such inputs 38 include signals relating to the power take off (PTO), a hitch, a transmission, an electro-hydraulic remote (EHR) and/or the engine. The I/O unit 36 can also receive inputs from an HTS control switch 40, a sequence step button 42, a geospatial or navigation controller 44 (such as a GPS unit), and a visual display 46. The I/O unit 36 also generates outputs 48 that control the same sub-systems; namely, the PTO, the hitch, the transmission, the EHR and the engine. The I/O unit 36 also produces outputs to the visual display 46

The visual display 46 can be an LED or LCD display, or any other suitable type of display. The HTS control switch 40 and the sequence step button 42 are illustrated as virtual buttons on the visual display 46, but could also be separate discrete inputs, depending on the configuration. The visual display 46 may be configured as a touch screen operator interface which provides customized inputs for start recording, stop recording, pause recording, and trigger type(s) for recording. The visual display 46 can be customized to present pre-selection of manual playback, pre-selection of automatic playback, pause playback, and stop playback. The command interface on an armrest can present pre-selection of manual playback command, pre-selection of automatic playback command and start/stop recording. The sequence step button 42 can be used to insert a pause during recording (at recording time), to pause the playback (automatic playback) or start from pause in automatic playback or to playback a next step during a manual playback.

During operation, various methodologies may be used to record an HTS for later playback at a headland. For example, on approaching a headland during a tillage operation the operator, can depress the HTS control switch 40 to commence recording of an HTS. The HTS events (i.e., actions or steps) then taken by the driver such as changing gears, reducing the engine speed, raising the hitch and/or raising the rear end of the tillage implement, can be stored in the memory 34. In addition, the operator can optionally record a pause signal by pressing the sequence step button 42. This will result in the next step having to be initiated by the driver rather than automatically carried out during the playback mode. On ending the turn at the first headland, the driver can save the HTS recording. On reaching the opposite end of the field, the driver can commence recording a new HTS for the opposite headland in the same way as was done for the first. Eventually, the driver can cease recording by once again operating the HTS control switch 40.

Figure 4:
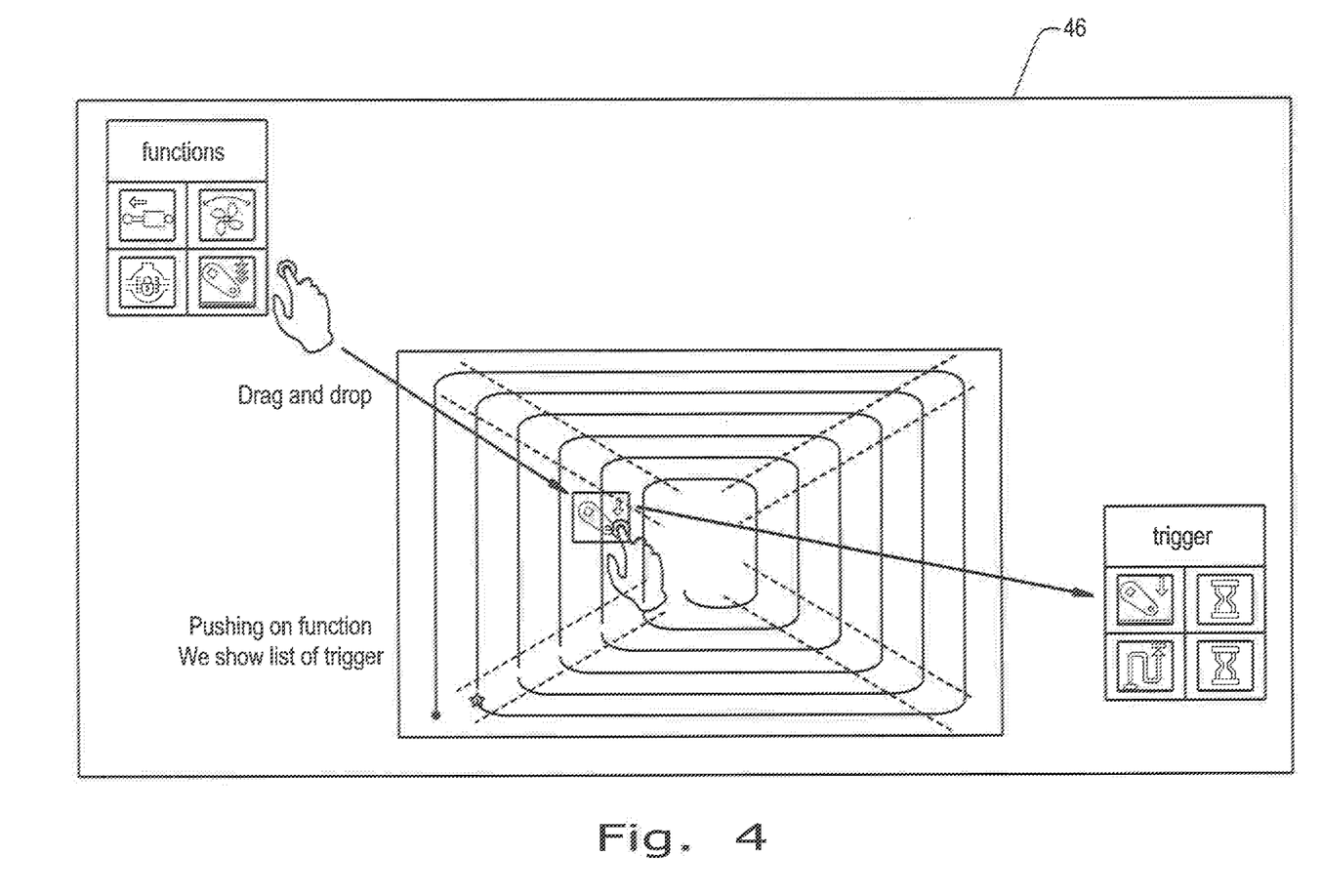
FIG. 4 illustrates information which can be displayed on a visual display to an operator.

Referring now to FIGS. 2 and 4, conjunctively, there is shown a portion of a visual display 46 for displaying a portion or all of an HTS to an operator. The HMS 30 is configured to display a real-time map on the visual display 46, including a position of the vehicle 10 on the map (shown as a star in FIG. 2), and at least one future HTS event forming at least part of an HTS. The HMS 30 is configured to allow an operator to modify at least one HTS event on the real-time map, even "on-the-fly" during operation of the vehicle 10. The term "real-time", as used herein with respect to the visual display 46, is intended to cover the situation where the visual display is continually updated as the operator modifies at least one HTS event on the visual display 46, as well as the situation where the visual display is updated until the time that the operator signals to add/delete/change triggers on the visual display 46 and the display is paused while the modification is made.

The HMS 30 can also be configured to display at least one past HTS event on the real-time map. The past HTS event can be displayed in a visually distinct manner from each future HTS event on the real-time map, such as by fading out the past HTS event on the real-time map (see FIG. 2). Alternatively, the past HTS event can be changed to a different color on the visual display 46.

Referring again to FIG. 4, the HMS 30 is configured to allow an operator to modify at least one HTS event on the real-time map using any suitable technique. For example, as shown in FIG. 4, the operator can "drag and drop" an HTS event (more simply referred to as a "function" on the map) to a desired location on the map. Other ways of modifying the HTS event could be with a mouse, a pointer, arrows on a keyboard, etc.

The HTS event can be modified by allowing the operator to: 1) add an HTS event to the real-time map; 2) delete an HTS event from the real-time map; 3) change a position at which an HTS event occurs on the real-time map; and/or 4) change at least one event trigger associated with the HTS event. In the example shown in FIG. 4, the operator is adding an HTS event corresponding to a lowering of a 3 point hitch to the real-time map at a desired location. The operator can then access associated event triggers for this HTS event by pushing a virtual button on the display icon.

Each event trigger corresponds to a position of the vehicle on the real-time map and/or a current state of at least one component on the vehicle. The position of the vehicle 10 is automatically updated using the GPS sensor 44, while the event triggers associated with a current state of the at least one component are sensed variables. For example, a current state of a component can correspond to: 1) a position of a three-point hitch; 2) a raised or lowered state of an EHR; 3) an operating speed of an engine; 4) an engaged or disengaged state of a PTO; and/or 5) a shift of a transmission.

Figure 5A:
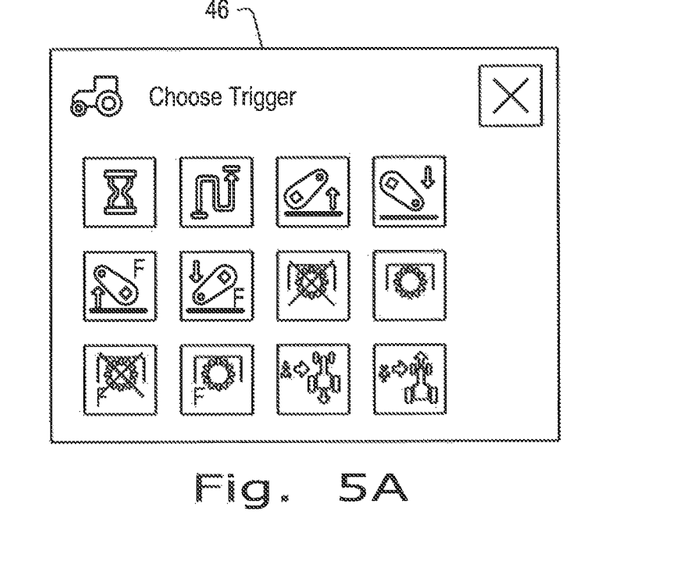
FIG. 5A illustrates various triggers that can be displayed to an operator during programming of an HTS.
Figure 5B:
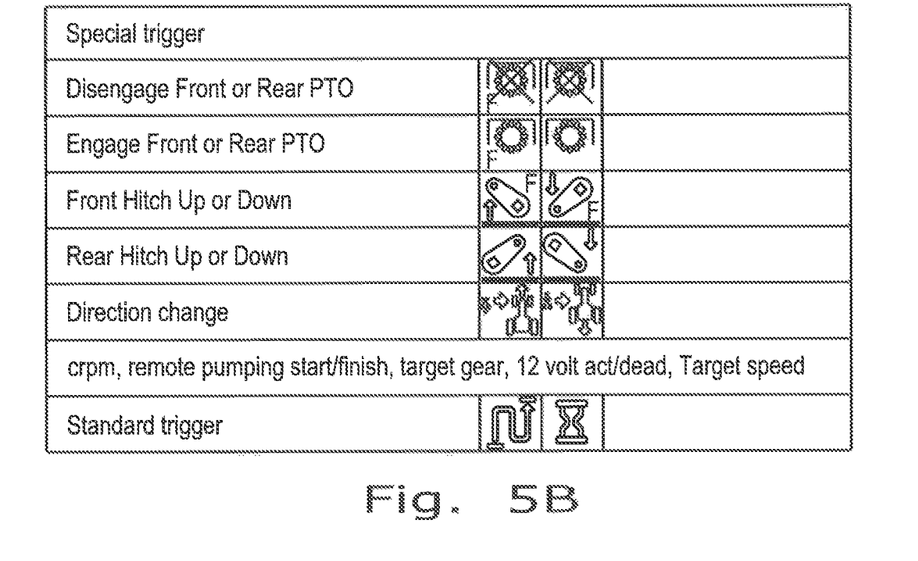
FIG. 5B illustrates in more detail some of the event triggers shown in FIG. 5A.

Other special event triggers are also possible, such as a change in direction of the vehicle 10 and/or a time based event trigger (see FIG. 5 for various types of possible event triggers).

The output functions associated with an HTS also correspond to the same type of components on the vehicle 10. The output functions can be thought of as involving an output signal for actuation of the component, as well as actual controlled operation of the component. The output signals and corresponding actuation can include: 1) a hitch command; 2) an electro-hydraulic remote (EHR) command; 3) an engine command; 4) a power take-off (PTO) command; and/or 5) a transmission command. The controlled operation of the component(s) can include: 1) raising or lowering a three-point hitch; 2) actuating an electro-hydraulic remote (EHR); 3) changing an operating speed of an engine; 4) engaging or disengaging a power take-off (PTO); and 5) upshifting or downshifting a transmission. It will be appreciated that the described output signals, and corresponding outputs through controlled operation of the components are only exemplary, and many other output signals and outputs are also possible.

The HMS 30 may also be configured to display various other information to an operator in a manner which is easier to observe and/or allows easier programming of an HTS. For example, the HMS can be configured to prioritize the display of the HTS events on the real-time map, whereby an HTS event with a higher priority is given display preference over an HTS event with a lower priority. The HTS event with a higher priority can be positioned on the real-time map in place of an HTS event with a lower priority, or in a layered manner over the top of an HTS event with a lower priority.

For example, assume that an HTS includes distinct HTS events of downshifting the transmission and reducing the engine speed, and both HTS events occur in close time proximity to each other such that both icons cannot be displayed in the same space on the real-time map. The HMS could prioritize these 2 HTS events such that the downshifting has a higher priority and only display the downshifting icon on the real-time map. Alternatively, icons for downshifting and reducing the engine speed could be shown in a layered manner on the real-time map, with the icon for downshifting on top of the icon for reducing the engine speed. This type of prioritizing allows the most relevant data to be displayed to an operator, while still allowing access to the lesser priority data.

As another example, the HMS 30 could be configured to "learn" which HTS events an operator is likely to use, and maintain a library with suggested HTS events for part or all of an HTS. For example, suggested HTS events can be based on a statistical analysis of most commonly used past HTS events. The HMS can then provide an operator with at least a portion of a suggested future HTS, based on the statistically probable HTS. This can save the operator programming time, and also keep driving distractions to a minimum when the operator modifies an HTS on-the-fly.

The HMS 30 may be operatively adapted to move the starting point for the next HTS according to at least one of a real-time command by the operator, a position of the tractor 10 and/or a maneuver undertaken by the tractor 10.

The HMS 30 may also be operatively adapted to populate a list of "tips" on the visual display 46 to provide an operator with improved editing capabilities of the operator in a specific software environment that may or may not coincide with other items currently displayed on the visual display 46.

The HMS 30 may also be operatively adapted to add a new HTS or a portion of an HTS to the visual display 46. This can occur automatically and the user can then confirm the HTS. Alternatively, the (portion of an) HTS can be added and then overwritten if the operator begins to place an HTS event where the new HTS was added.

The HMS 30 may also be operatively adapted to allow an operator to select a partial sequence of an HTS stored in the memory 34 for completing an HTS being currently executed the an operator.

The HMS 30 may also be operatively adapted to "suggest" to an operator a partial sequence of an HTS stored in the memory 34 for completing an HTS being currently executed by the operator. This can occur automatically and the user can then confirm the partial HTS. Alternatively, the partial HTS can be added and then overwritten by the operator.

The HMS 30 may also be operatively adapted to determine a predefined path for an HTS at a headland and "suggest" or populate free empty space along the predefined path with one or more HTS events which will be executed when the tractor reaches the respective locations along the predefined path. The HTS events can be based upon a prior HTS executed by the operator, or other HTS's which are stored in the memory 34.

Figure 6:
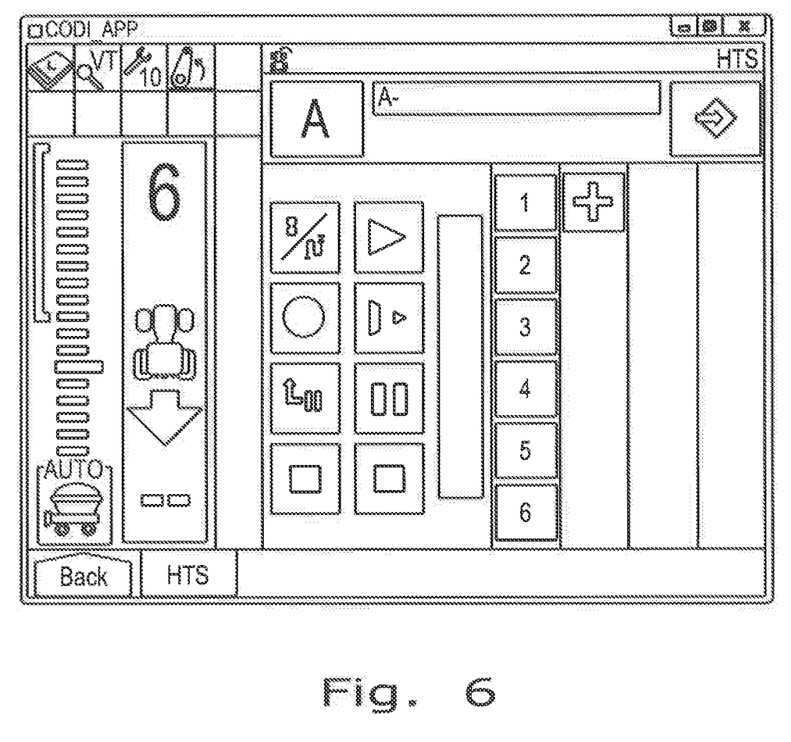
FIG. 6 is an example of a home screen which may be presented to an operator on the visual display.
Figure 7A:
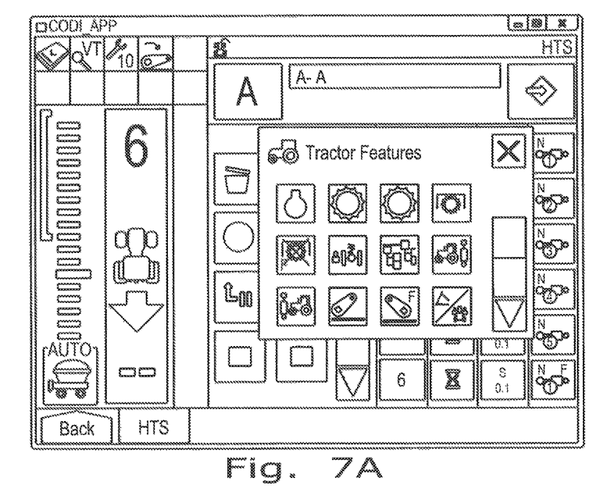
FIGS. 7A, 7B, 7C and 7D are examples of display screens which may be presented to an operator on the visual display for an editing function.
Figure 7B:
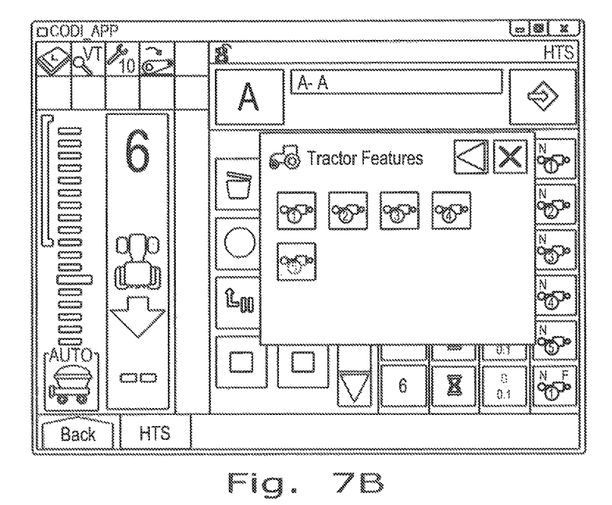
Figure 7C:
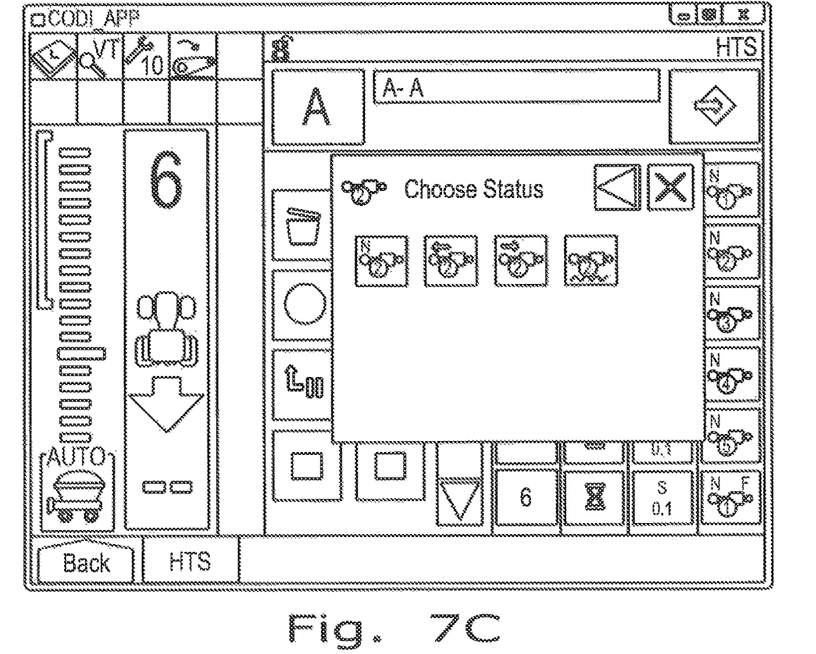
Figure 7D:
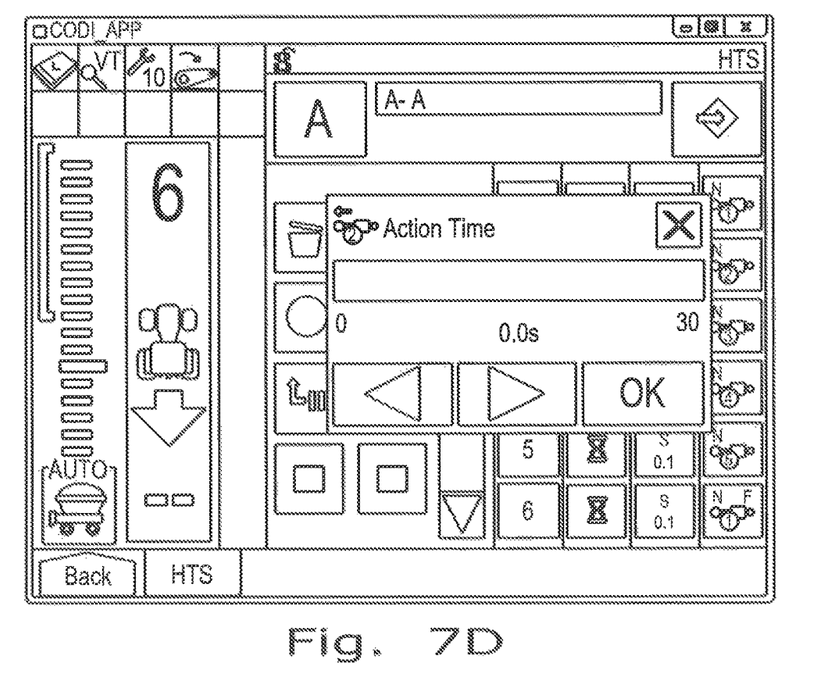

FIGS. 6-9 illustrate various examples of display screens which may be displayed to an operator during operation of the HMS 30. FIG. 6 is an example of a home screen which may be presented to an operator on the visual display 46. This screen can provide an operator with a capability to select 1) a base sequence and repetition mode (A, B, A/B and B/A); 2) a trigger base (time or distance); and 3) an operation mode (recording, loading or editing).

FIGS. 7A, 7B, 7C and 7D are examples of display screens which may be presented to an operator on the visual display for an editing function. After an operator depresses the plus (+) button in FIG. 6, the operator selects a tractor feature shown in FIG. 7A (e.g., rear EHRs). Then the operator can select the tractor function shown in FIG. 7B (e.g., EHR number 1 through 5). Then the operator can select the function state shown in FIG. 7C (e.g., retract EHR). Then the operator can select the function value shown in FIG. 7D (e.g., action time and flow rate).

Figure 8A:
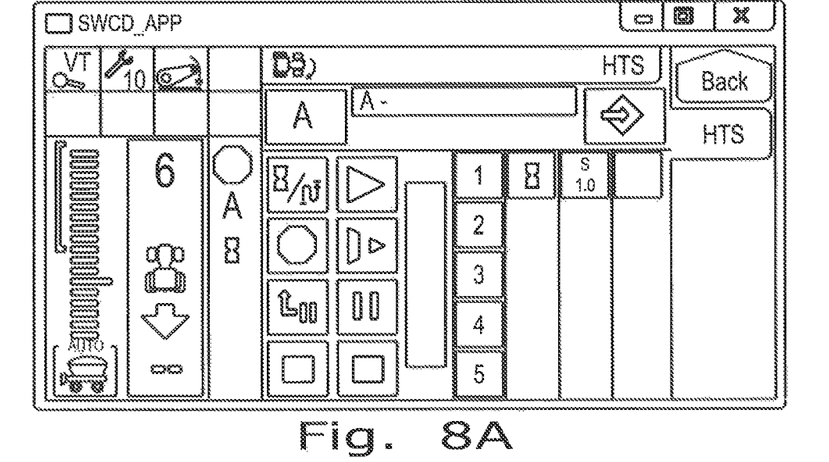
FIGS. 8A, 8B and 8C are examples of display screens which may be presented to an operator on the visual display for a recording function.
Figure 8B:
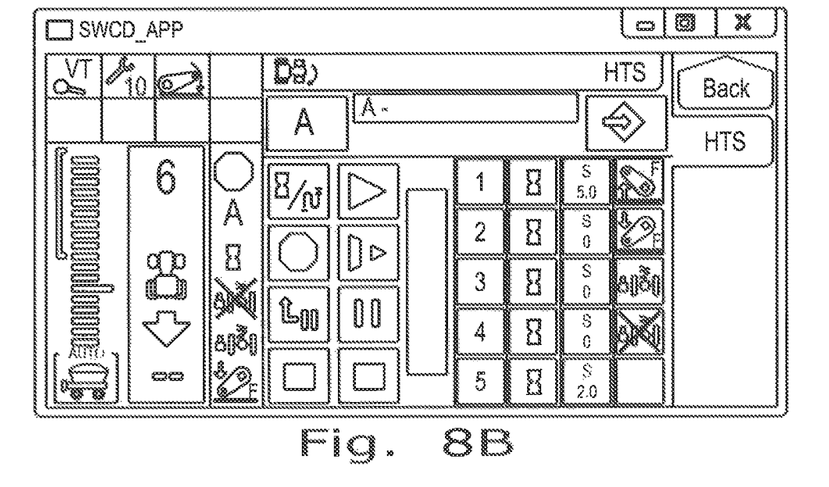
Figure 8C:
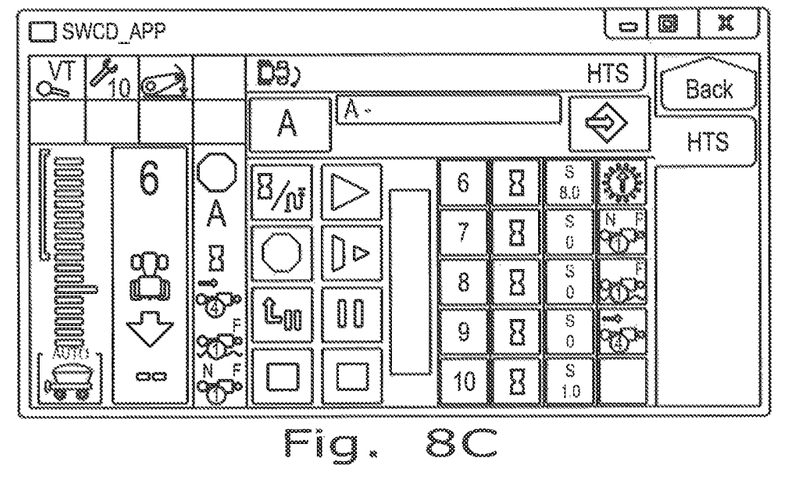

FIGS. 8A, 8B and 8C are examples of display screens which may be presented to an operator on the visual display for a recording function. In FIG. 8A, the operator can depress the circular RECORD button on the display. The time counter then starts increasing the elapsed time as shown in FIG. 8B (or the space counter is refreshed according to a traveled distance, depending on whether the trigger is time or distance based). The start of sequence occurs when the sequence step button 42 is depressed, or on the first commanded HTS event. The HTS is stored in the memory 34 after each command (HTS event) has been activated by the operator.

Figure 9A:
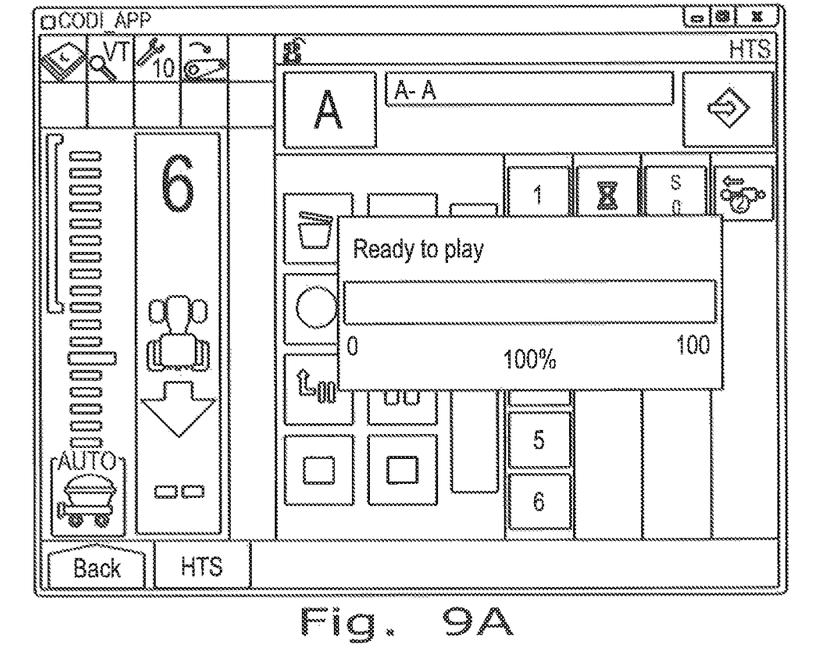
FIGS. 9A, 9B and 9C are examples of display screens which may be presented to an operator on the visual display for a playback function.
Figure 9B:
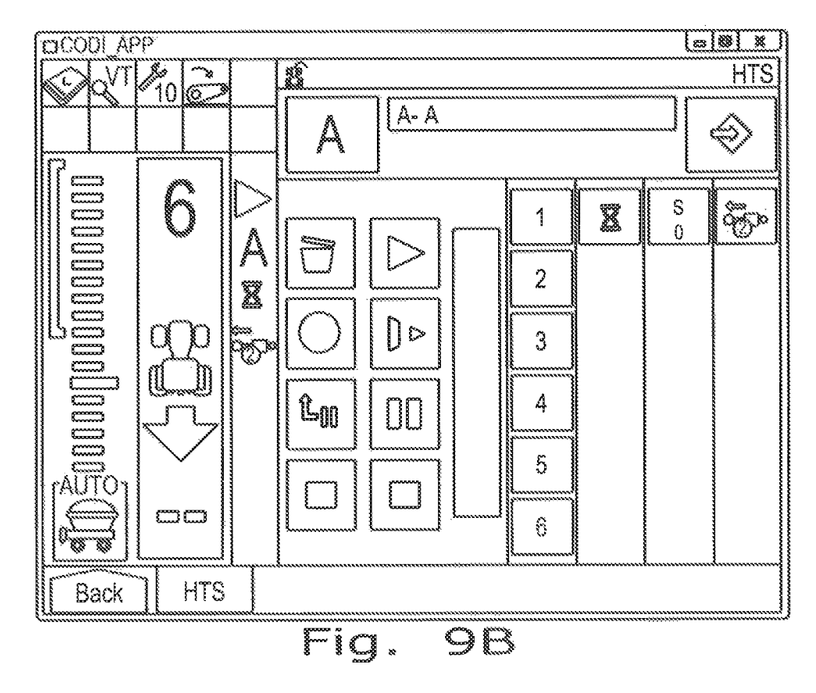
Figure 9C:
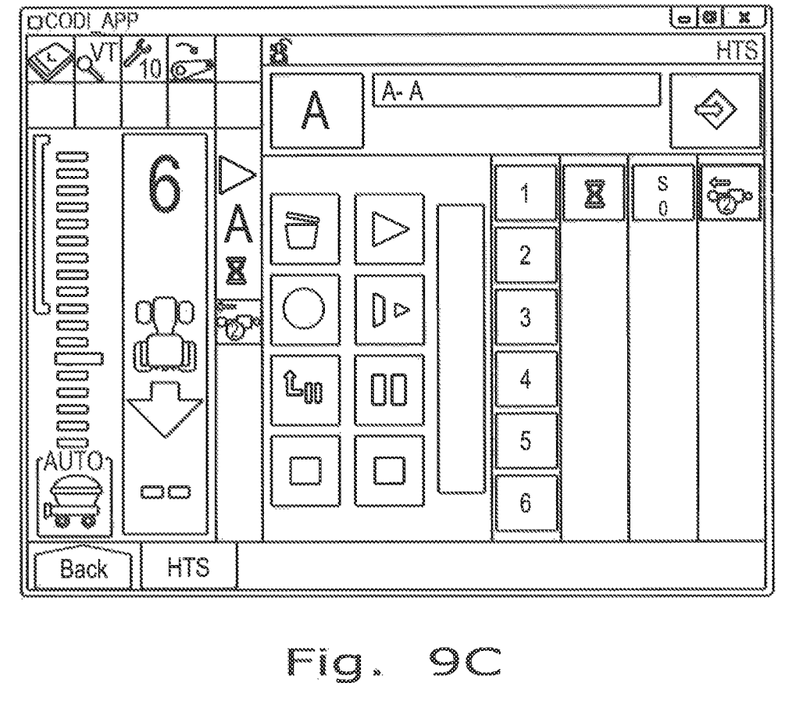

FIGS. 9A, 9B and 9C are examples of display screens which may be presented to an operator on the visual display for a playback function. The operator can depress the A text window (FIG. 9A) and then select a stored HTS sequence 1 through 6 (FIG. 9B). Auto play is assumed to be the default in the illustrated example, rather than manual stepped playback. The operator can depress the sequence step button 42 to begin the auto playback (FIG. 9C).

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An agricultural vehicle, comprising:
   at least one geospatial sensor for locating the vehicle within a geographic area;
   at least one event trigger;
   at least one actuator for actuating a component onboard the vehicle; and
   a headland management system (HMS) for carrying out a headland turn sequence (HTS) at a predetermined location within the geographic area, the HMS including:
      a memory for storing at least a portion of an HTS; and
      a visual display for displaying at least a portion of an HTS;
   wherein:
      the HMS is configured to display a real-time map on the visual display, including a position of the vehicle on the map, and HTS events forming at least part of an HTS, the HMS being configured to allow an operator to modify at least one of said HTS events on the real-time map; and
      the HMS is configured to prioritize the display of the HTS events on the real-time map, whereby an HTS event with a higher priority is given display preference over an HTS event with a lower priority.

2. The agricultural vehicle of claim 1, wherein the HMS is configured to allow an operator to modify said at least one of said HTS events on the real-time map by at least one of:
   adding an HTS event to the real-time map;
   deleting an HTS event from the real-time map;
   changing a position at which an HTS event occurs on the real-time map; and
   changing at least one event trigger associated with the HTS event.

3. The agricultural vehicle of claim 1, wherein the HTS events include at least one of:
   a hitch command;
   an electro-hydraulic remote (EHR) command;
   an engine command;
   a power take-off (PTO) command; or
   a transmission command.

4. The agricultural vehicle of claim 1, wherein the HTS events include at least one of:
   raising or lowering a three-point hitch;
   actuating an electro-hydraulic remote (EHR);
   changing an operating speed of an engine;
   engaging or disengaging a power take-off (PTO); or
   upshifting or downshifting a transmission.

5. The agricultural vehicle of claim 1, wherein said at least one event trigger corresponds to at least one of a position of the vehicle on the real-time map or a current state of said component.

6. The agricultural vehicle of claim 5, wherein the current state of the component includes at least one of:
   a position of a three-point hitch;
   a raised or lowered state of an electro-hydraulic remote (EHR);
   an operating speed of an engine;
   an engaged or disengaged state of a power take-off (PTO); or
   a shift of a transmission.

7. The agricultural vehicle of claim 1, wherein an HTS event with a higher priority is positioned on the real-time map:
   in place of an HTS event with a lower priority; or
   in a layered manner over the top of an HTS event with a lower priority.

8. The agricultural vehicle of claim 1, wherein the HTS evens displayed on the real-time map include at least one future HTS and at least one past HTS event.

9. The agricultural vehicle of claim 8, wherein each said at least one past HTS event is visually distinct from each said at least one future HTS event on the real-time map.

10. The agricultural vehicle of claim 9, wherein each said at least one past HTS event is faded out on the real-time map as comparted to said at least one future HTS event.

11. The agricultural vehicle of claim 1, wherein the HMS is configured to:
   learn at least a portion of a probable HTS, based upon at least a portion of a past HTS; and
   provide an operator with at least a portion of a suggested future HTS, based on the probable HTS.

12. The agricultural vehicle of claim 1, wherein the HMS is configured to provide an operator with at least a portion of a suggested future HTS.

13. The agricultural vehicle of claim 1, wherein the HMS is configured to allow an operator to select at least a portion of an HTS stored in the memory.

14. The agricultural vehicle of claim 1, wherein the HMS is configured to move a starting point for a future HTS on the real time map according to at least one of:
   a real-time command by the operator;
   a position of the vehicle; or
   a maneuver undertaken by the vehicle.

15. An agricultural vehicle, comprising:
at least one geospatial sensor for locating the vehicle within a geographic area;
at least one actuator for actuating a component onboard the vehicle; and
a headland management system (HMS) for carrying out a headland turn sequence (HTS) at a predetermined location within the geographic area, the HMS including:
a memory for storing at least a portion of an HTS; and
a visual display for displaying at least a portion of an HTS;
wherein:
the HMS is configured to display a real-time map on the visual display, including a position of the vehicle on the map, and HTS events forming at least part of an HTS; and
the HMS is configured to prioritize the display of the HTS events on the real-time map, whereby an HTS event with a higher priority is given display preference over an HTS event with a lower priority.

16. The agricultural vehicle of claim 15, wherein an HTS event with a higher priority is positioned on the real-time map in place of an HTS event with a lower priority.

17. The agricultural vehicle of claim 16, wherein an HTS event with a higher priority is positioned on the real-time map in a layered manner over an HTS event with a lower priority.

18. The agricultural vehicle of claim 15, wherein the HTS events displayed on the real-time map include at least one future HTS event, the HMS being configured to allow an operator to modify the at least one future HTS event on the real-time map.

19. The agricultural vehicle of claim 15, further comprising at least one event trigger for at least one HTS event of the HTS events displayed on the real-time map, the at least one event trigger correspond to a current state of the component.

20. The agricultural vehicle of claim 19, wherein the current state of the component includes at least one of:
a position of a three-point hitch;
a raised or lowered state of an electro-hydraulic remote (EHR);
an operating speed of an engine;
an engaged or disengaged state of a power take-off (PTO); or
a shift of a transmission.

* * * * *